March 3, 1964
L. E. GILREATH
3,123,012
HYDRAULIC GEAR APPARATUS
Filed Feb. 18, 1963
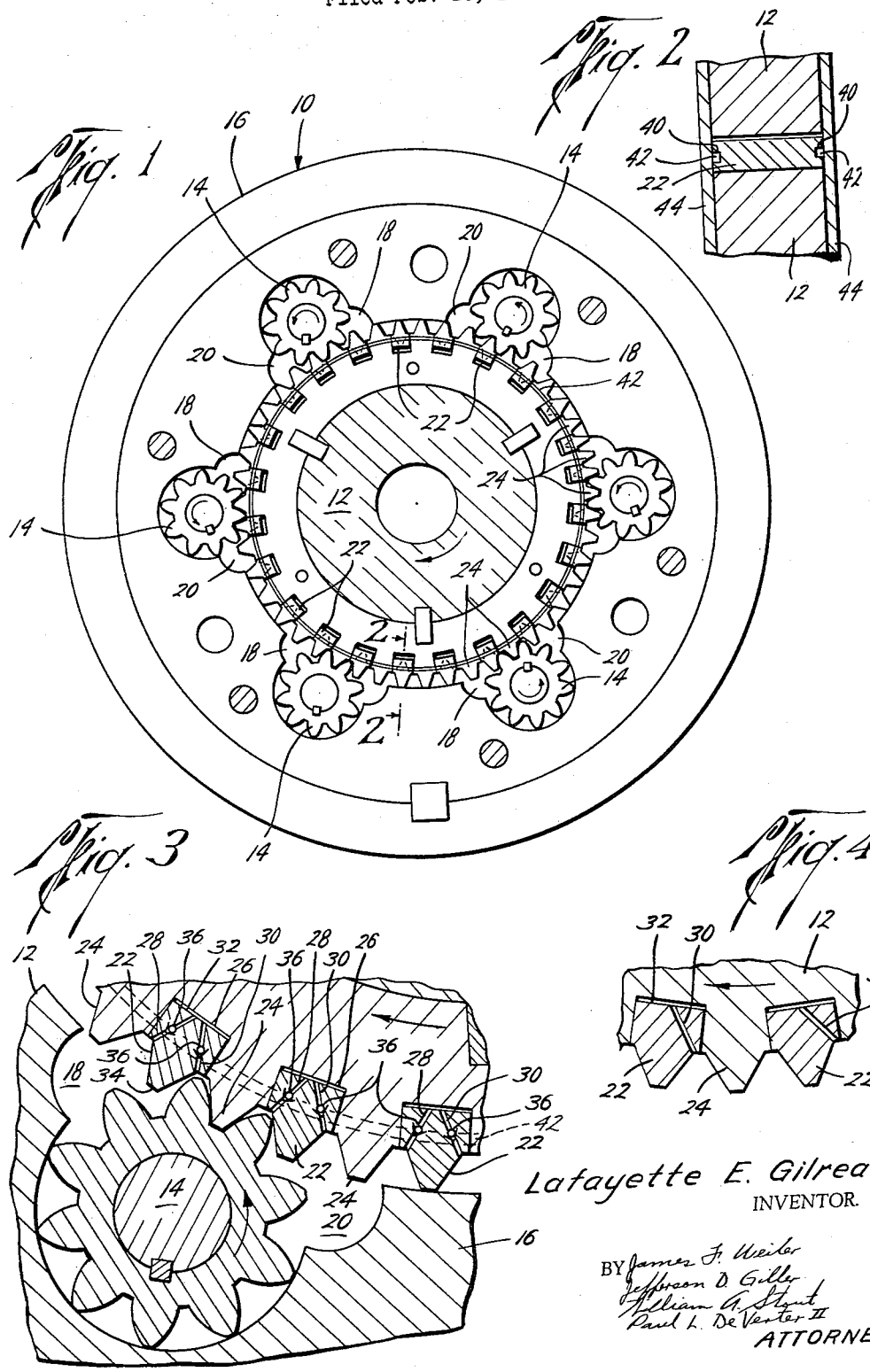
Lafayette E. Gilreath
INVENTOR.
BY James F. Weiler
Jefferson D. Giller
William A. Stout
Paul L. DeVenter II
ATTORNEYS

United States Patent Office 3,123,012
Patented Mar. 3, 1964

3,123,012
HYDRAULIC GEAR APPARATUS
Lafayette E. Gilreath, 7623 Arnim, Houston, Tex.
Filed Feb. 18, 1963, Ser. No. 259,215
2 Claims. (Cl. 103—126)

The present invention relates to a hydraulic gear apparatus and more particularly, relates to an improvement in a hydraulic gear motor or pump which prevents slippage or bypassing of the hydraulic fluid about the main or sun gear teeth thereby allowing the use of higher pressures and providing a greater efficiency.

While hydraulic gear motors and pumps have been developed that provide more horsepower in less space and weight than any other known source of power, hydraulic gear motors or pumps are generally limited to pressures of 1000 pounds per square inch. In addition, because of the running tolerances that are maintained to prevent frictional contact of the moving parts under load, the present hydraulic apparatus has had a rather low overall efficiency. That is, because of the running clearances required for proper operation, the hydraulic fluid bypasses or slips by the teeth of the main or sun gear in a hydraulic gear motor or pump causing a loss in pressure and efficiency. My patent entitled Hydraulic Motor, No. 2,934,044, dated April 26, 1960, discloses the uses of floatable teeth on the main or sun gear which are urged radially outward into a tighter engagement with the planet gears and housing to prevent slippage of the hydraulic fluid past the sun gear teeth. The present invention is directed to other improvements for urging the teeth outward into a sealing contact and one in which they are urged outwardly in proportion to the pressure of the hydraulic fluid used with the hydraulic gear apparatus.

It is a general object of the present invention to provide a hydraulic gear apparatus that utilizes alternate floating teeth on the main or sun gear which are urged outwardly into a sealing contact with the other members of the apparatus by the hydraulic fluid to prevent slippage of the fluid by the teeth and thus allow the use of higher pressures and provide a greater torque.

Yet a further object of the present invention is the provision of fluid passageways or ports between the front and rear of radially movable sun gear teeth whereby hydraulic fluid may flow to the back side of the movable teeth and thus urge them into a sealing relationship with the other parts of the hydraulic apparatus and thus urge the teeth into such a sealing relationship in proportion to the pressure of the hydraulic fluid operating in the motor.

A still further object of the present invention is the provision of an apparatus for providing a sealing relationship between the teeth of a sun gear or main gear of a hydraulic gear motor or pump with the other parts of the hydraulic motor by providing alternate radially movable teeth on the sun gear or main gear that have a hydraulic port or passageway from the rear of the movable teeth to the front of the teeth on each side of the gear tooth crest.

Yet a further object of the present invention is the provision of an apparatus allowing the use of high pressures and high torque in a hydraulic gear motor or pump by providing alternately outwardly movable teeth on the sun or main gear which include a fluid passageway through the tooth, and a check valve in the passageway for providing a hydraulic force to urge the tooth outwardly into sealing engagement with the other parts of the hydraulic motor or pump.

Other and further features and advantages will be apparent from the following description of presently preferred embodiments of the invention, given for the purpose of disclosure and taken in conjunction with the accompanying drawing, where like character references designate like parts throughout the several views, and where, FIGURE 1 is an elevational view, in cross section, of a hydraulic gear apparatus of the present invention, FIGURE 2 is an enlarged fragmentary cross sectional view taken along the lines 2—2 of FIGURE 1, FIGURE 3 is an enlarged, detailed, fragmentary cross sectional view illustrating one embodiment of the movable teeth of the present invention, and FIGURE 4 is an enlarged, fragmentary cross sectional view illustrating another form of the alternate movable teeth of the main gear.

Referring now to the drawings, the numeral 10 generally designates a hydraulic gear motor or pump, depending on its use, of the present invention and includes as in generally conventional, a main or sun gear 12, a plurality of pinion or planet gears 14, all of which are suitably and conventionally enclosed in a housing 16. In addition, hydraulic ports 18 and 20 are provided on opposite sides of the pinion or planet gears 14. Assuming that the apparatus is to be used as a motor with the sun gear rotating in a clockwise direction and with the pinion or planet gears 14 therefor rotating in a counterclockwise direction as indicated by the arrows, the ports 18 are the inlet fluid ports, and the ports 20 are the outlet fluid ports. As in the usual operation, the hydraulic fluid enters the housing 16 through ports 18 and flows in two directions. The fluid flows around the planet gears 14 toward the outlet port 20 on the opposite side of the planet gears 14, and simultaneously flows between the sun gear 12 and the housing 16 and pushes the sun gear 12 in a clockwise direction so that the fluid may flow to the next adjacent clockwise positioned outlet port 20.

All of this is generally conventional. However, when the motor or pump is loaded there must be a sufficient clearance between the gears and the housing to avoid frictional contact and thus the required running clearances generally cause the fluid pressures on hydraulic gear motors or pumps to be limited to 1000 pounds per square inch. In addition, the required running clearances cause the efficiency to be relatively low. That is, if too close tolerances are maintained between the gears and the housing they will bind on heavy loads. On the other hand, when too much clearance or tolerance is allowed between the housing or the gears, the hydraulic fluid will flow around the gears and between the housing and therefore by bypassing the gears. There is referred to as "slippage" and results in a loss of power.

The present invention is directed, as is my Patent No. 2,934,044, to providing that the alternate teeth on the sun gear or main gear 12 are floatably mounted in the gear 12 for outward movement.

Thus referring to the drawing, the sun or main gear 12 includes alternate radialy movable teeth 22 and alternately fixed teeth 24. The movable teeth 22 are mounted in radially extending slots 26 in the sun gear 12 and the teeth 22 are radially movable therein.

Referring now particularly to FIGURE 3, two fluid passageways or ports 28 and 30 communicate between the back 32 of the movable teeth 22 and the front of the teeth. Preferably, the passageways 28 and 30 are in the teeth 22 for ease of construction. It is noted that one of the ports or passageways 28 communicates with the front of the teeth 22 on one side of the crest 34 of the movable teeth 22 while the other port or passageway 30 communicates with the front of the teeth 22 on the opposite side of the crest 34. In addition, a check valve 36 may be provided in each of the fluid ports or passageways 28 and 30 to allow the passage of hydraulic fluid to the back side of the movable teeth 22, but preventing the flow of fluid from back to front.

Thus, pressure from the inlet pressure port 18 will enter the fluid ports 28 and 30 and act on the back 32 of the movable teeth 22 to move them radially outward and provide a sealing contact between the crest 34 of the teeth 22 and the housing 16. It is to be noted, referring to FIGURE 3 and assuming that the direction of rotation of the gears 12 and 14 are as indicated by the arrows, that when the movable teeth 22 move clockwise and into a sealing relationship with the housing 16, the crest 34 of the movable teeth 22 contacts the housing 16 to provide a sealing relationship. At this position high pressure fluid from port 18 may still enter passageway 30 of the movable tooth 22 and provide a hydraulic pressure on the backside 32 of the movable tooth which will exert a greater force in an outward radial direction, because of the greater back surface area acted on as compared to the front side area, to urge the movable tooth 22 into a tight sealing arrangement with the housing 12. In addition, it is to be noted that as the fluid pressure operating the hydraulic motor increases the force on the back of the movable teeth 22 will also increase thereby providing a sealing arrangement which will reduce high pressure slippage and will allow the operation of the motor or pump, at higher torques than are presently used.

Of course, the check valves 36 may be omitted from the passageway or ports 28 and 30 and the movable teeth 22 will still move outwardly and seal against the housing as previously described. This will occur, again referring to FIGURE 3, because when the fluid is added in groove passageway 30 it cannot escape through passageway 28 as the next adjacent fixed tooth 24 will block the draining of the hydraulic pressure from behind the movable teeth 22. However, the omission of the check valves 36 will allow the earlier passage of fluid out the passageway 28 to the next adjacent outlet port 20 when the movable teeth 22 rotate to a point so that passageway 28 is in fluid communication with the outlet 20. This will effectively decrease the sealing effect of the number of teeth by one on the sun gear 12 between the adjacent outlet ports 18 and inlet ports 20 around the path of flow between the housing 16 and the sun gear 12. In some instances there may still be a sufficient number of teeth at any given moment between the ports 18 and 20 to prevent this from being a disadvantage, but as a general rule the more teeth on the sun gear 12 between the adjacent ports 18 and 20 the less will be the slippage between the sun gear 12 and the housing 16.

And of course, if the motor or pump 10 is to be operated in a single direction only, only a single passageway 30, as shown in FIGURE 4, need be utilized with the movable teeth 22. That is, as the sun gear 12 rotates in a clockwise direction, the high pressure hydraulic fluid from the input port 18 will flow to the passageway 30 and produce a hydraulic force on the back 32 of the movable teeth 22 which will be present during the period of movement of the movable teeth 22 passing by the housing 16 and this will insure a sealable contact. Of course, this particular force producing structure could not be used as shown in FIGURE 4 if the sun gear 12 moves in a counterclockwise direction as then the input hydraulic force would act to push the movable teeth 22 radially inward and expel the fluid at the back of the teeth 22.

Depending upon the size and shape of the inlet and outlet ports 18 and 20, it may be necessary to utilize teeth retaining means to limit the outward radial movement of the movable teeth 22. Referring now to FIGURE 2, circular grooves 40 are provided on the opposite faces of the ring gear 12 to receive therein a snap ring or hold-in ring 42 to limit the outward movement of the movable teeth 22. And, while not shown in FIGURE 1, side bearing plates 44 are provided on each side of the housing, sun gear 12 and pinion gears 14 to act as a wear plate and which also transversely hold the movable teeth 22 and snap ring 42 in place.

In use as a motor, hydraulic fluid is supplied to one of the sets of ports such as the ports 18 causing the sun or main gear 12 to rotate in a clockwise direction and the pinion or planet gears 14 to rotate in a counterclockwise direction as is conventional. As the movable teeth pass by the inlet ports 18 the high pressure incoming hydraulic fluid will pass through the fluid passageways 28 and 30 and pass to the back side 32 of the teeth 22 at which point in the cycle the pressure acting on the front and on the back of the teeth is generally equal and no force is produced to move the teeth radially. However, the crest 34 of the movable teeth 22 contacts and begins to seal with the housing 16 as it passes the inlet ports 18. The passageways 30 still remain in fluid communication with the inlet ports 18, and the hydraulic fluid flows behind the teeth 22 acting to urge the teeth radially outward since the hydraulic force on the back 32 of the teeth 22 is now greater than the hydraulic force between the teeth acting to push the teeth 22 inwardly. And of course, the greater the fluid pressure operating the motor 10, the greater will be the force differential behind the teeth 22, and the greater the sealing action of the movable teeth against the housing 16. Therefore, the slippage of hydraulic fluid about the sun gear teeth is reduced and consequently greater pressures and greater torque output power may be provided with such a hydraulic motor 10. And while the check valves 36 in the passageways 28 and 30 trap the fluid on the back of the teeth 22, they may be omitted if desired. Similarly, only a single fluid passageway 30 may be utilized, as seen in FIGURE 4, if the motor 10 is to operate in a single direction as previously described.

The present invention, therefore, is well suited and adapted to carry out the objects and attain the ends and advantages mentioned as well as others inherent therein. While presently preferred embodiments of the invention are given for the purpose of disclosure, numerous changes in details of construction, and arrangement of parts may be made which will readily suggest themselves to those skilled in the art and which are encompassed within the spirit of the invention and the scope of the appended claims.

What is claimed is:

1. In a hydraulic gear apparatus having a housing, a sun gear in said housing, a plurality of planet gears in said housing around the periphery and meshing with the sun gear, a hydraulic inlet port on one side of each planet gear and a hydraulic outlet port on the opposite side of each planet gear, the housing positioned adjacent the outer periphery of said sun gear and extending between adjacent planet gears a distance greater than the circumferential distance between alternate teeth on said sun gear, the improvement comprising, alternate teeth of said sun gear being mounted in the sun gear for radial movement inwardly and outwardly while the remainder of the teeth of the sun gear are secured to said sun gear, said sun gear having radially extending slots for supporting each individual radially movable tooth, means limiting the outward radial movement of said alternate movable teeth, two fluid passageways, one of which communicates between the face of each movable tooth on one side of the tooth crest to the slot containing the tooth at a point radially behind the tooth, and the second of said passageways communicating between the tooth face of each movable tooth on the second side of the tooth crest to said slot at a point radially behind said movable tooth.

2. The invention of claim 1 including, check valves in each of said passageways allowing the passage of fluid to said slot radially behind said teeth but preventing passage of fluid from said slot.

References Cited in the file of this patent

UNITED STATES PATENTS

| 18,986 | Palmer | Dec. 29, 1857 |
| 720,993 | Allen | Feb. 17, 1903 |
| 920,976 | Minor | May 11, 1909 |
| 1,460,875 | White | July 3, 1923 |
| 1,495,526 | Phillips | May 27, 1924 |
| 2,641,193 | Klessig | June 9, 1953 |
| 2,681,621 | Hedman | June 22, 1954 |
| 2,934,044 | Gilreath | Apr. 26, 1960 |